May 7, 1935.  W. B. MILLER  2,000,861
COATED WELDING ELECTRODE
Filed Dec. 23, 1933
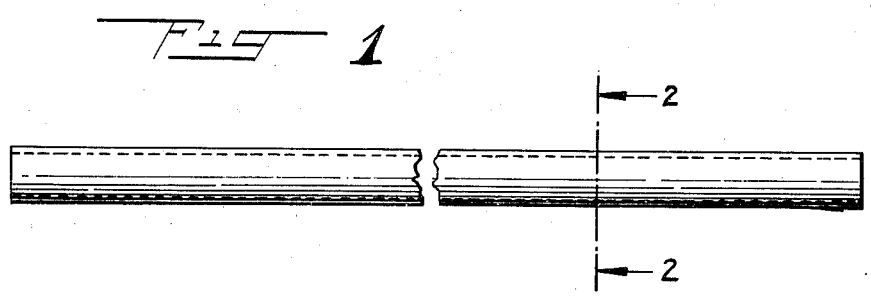
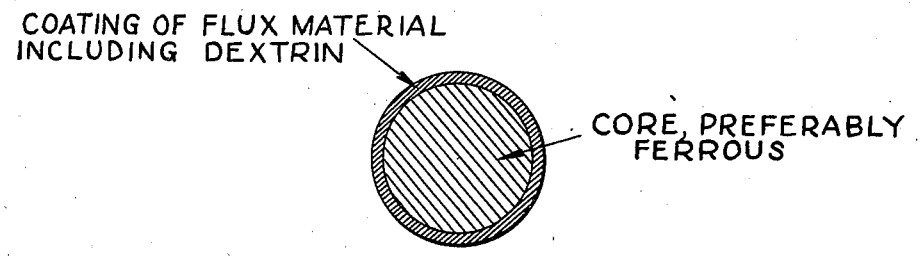
INVENTOR
WILBER B. MILLER
BY
ATTORNEY Patented May 7, 1935

2,000,861

UNITED STATES PATENT OFFICE 2,000,861

COATED WELDING ELECTRODE

Wilber B. Miller, Flushing, N. Y., assignor to Oxweld Acetylene Company, a corporation of West Virginia Application December 23, 1933, Serial No. 704,642

6 Claims. (Cl. 219—8)

This invention relates to welding electrodes. While it is especially adapted for use as an electrode in arc welding it is also capable of use as welding rod in other types of welding.

An object of my invention is to produce an electrode which shall give a sound weld, which is reliable in operation, which is easily prepared and which is relatively inexpensive.

These and other objects of my invention will be evident from the following specification having reference to the annexed drawing in which Figure 1 is a longitudinal view of a welding rod constructed in accordance with one embodiment of my invention and Figure 2 is a cross section taken on line 2—2 of Figure 1.

In my copending application Serial No. 666,235, filed April 15, 1933 I disclosed a coated welding rod having a coating of cellulose fabric such as cotton cloth with flux material outside the cellulose fabric. This fabric in disintegrating yields a gas protecting atmosphere around the arc and the flux mixture on melting affords a slag blanket over the melting and freezing metal in the weld.

I have found that satisfactory electrode coatings can be produced by adding up to about 10% of dextrin to certain mixtures disclosed in said application, especially the mixtures designated therein as VI and VII. However, I have found that slight modifications in proportions produce especially satisfactory deposits in arc welding.

I have found that electrode coatings made in accordance with the following table are especially satisfactory. In this table the first column represents the ingredient, the second column represents the preferred amount of the ingredient and the third column represents the approximate limits which I have found satisfactory.

| Ingredient | Preferred composition | Approximate range of composition |
|---|---|---|
| Slip clay | 50 | 40–60 |
| Iron oxide | 20 | 20–30 |
| Calcium carbonate | 20 | 20–30 |
| Feldspar | 20 | 15–30 |
| Rutile | 10 | 5–20 |
| Manganese ore | 5 | 5–15 |
| Carbonaceous material | 5 | 5–15 |
| Ferromanganese | 8 | 5–20 |
| Ferrochrome | 5 | 2–8 |
| Ferrosilicon | | 0–5 |
| Dextrin | 10 | 1–15 |

The above compositions are given in parts by weight. These ingredients may be mixed with diluted water glass for dipping purposes or with undiluted water glass for plastic extrusion mixtures, and are preferably used as coatings for ferrous electrodes. The slip clay is preferably that type known in the ceramic industry as Albany slip clay. The carbonaceous material is advantageously graphite, although my invention is not so limited.

I have found that electrodes of mild steel containing 0.13% to 0.18% carbon and 0.40% to 0.60% manganese coated with the preferred composition given above will produce welds having a strength of over 60,000 lbs. per square inch and a free bend test ductility of over 30%.

I claim:

1. A welding rod consisting of a metal core having a coating thereon, the coating consisting of slip clay 40–60 parts, iron oxide 20–30 parts, calcium carbonate 20–30 parts, feldspar 15–30 parts, rutile 5–20 parts, manganese ore 5–15 parts, carbonaceous material 5–15 parts, ferromanganese 5–20 parts, ferrochrome 2–8 parts and dextrin 1–15 parts by weight.

2. A welding electrode having a ferrous core and a coating of flux material thereon, said coating consisting of slip clay 40–60 parts, iron oxide 20–30 parts, calcium carbonate 20–30 parts, feldspar 15–30 parts, rutile 5–20 parts, manganese ore 5–15 parts, carbonaceous material 5–15 parts, ferromanganese 5–20 parts, ferrochrome 2–8 parts, ferrosilicon, said ferrosilicon not being in excess of 5 parts, and dextrin 1–15 parts by weight.

3. A welding rod consisting of a metallic core and a coating on said core, said coating having the following approximate composition by weight; slip clay 50 parts, iron oxide 20 parts, calcium carbonate 20 parts, feldspar 20 parts, rutile 10 parts, manganese ore 5 parts, carbonaceous material 5 parts, ferromanganese 8 parts, ferrochrome 5 parts, dextrin 10 parts.

4. A welding rod consisting of a metal core having a coating thereon, the coating consisting of slip clay 40–60 parts, iron oxide 20–30 parts, calcium carbonate 20–30 parts, feldspar 15–30 parts, titanium ore 5–20 parts, manganese ore 5–15 parts, carbonaceous material 5–15 parts, ferro alloys of the group consisting of manganese, chromium and silicon 7–33 parts and dextrin 1–15 parts by weight.

5. A welding rod having a ferrous core and a coating of flux material thereon, said coating consisting of slip clap 40–60 parts, calcium carbonate 20–30 parts, feldspar 15–30 parts, carbonaceous material 5–15 parts, ferromanganese 5–20 parts, ferrochromium 2–8 parts, oxides of iron, titanium and manganese 30 to 65 parts and dextrin 1–15 parts by weight.

6. A welding electrode comprising a ferrous core containing about 0.13% to 0.18% carbon and about 0.40% to 0.60% manganese; and a coating on said core, said coating comprising approximately the following composition in parts by weight: slip clay, 50 parts; iron oxide, 20 parts; calcium carbonate, 20 parts; feldspar, 20 parts; rutile, 10 parts; manganese ore, 5 parts; carbonaceous material, 5 parts; ferromanganese, 8 parts; ferrochrome, 5 parts; and dextrin, 10 parts.

WILBER B. MILLER.